INVENTORS
Robert W. Dingman, Laurent P. Michel
William D. Schaeffer, Robert N. Secord
by Hurray, Jenney, Witter & Hildreth
Attys.

United States Patent Office 2,801,901
Patented Aug. 6, 1957

2,801,901

PROCESS FOR MAKING ALUMINUM OXIDE FROM HYDRATED ALUMINUM

Robert W. Dingman, Sharon, Laurent P. Michel, Watertown, Robert N. Secord, Reading, and William D. Schaeffer, Needham, Mass., assignors to Godfrey L. Cabot, Inc., Boston, Mass., a corporation of Massachusetts Application March 23, 1953, Serial No. 343,908

5 Claims. (Cl. 23—142)

This invention relates to aluminum oxide production and comprises a novel process for producing aluminum oxide from salts of aluminum in the solid state.

Aluminum oxide is one of the more common industrial raw materials. It is available in varying degrees of purity and subdivision, in general the finer and purer forms being the more valuable. The pigment grade is, by far and away, the most important and most valuable grade of aluminum oxide, such being composed of particles averaging below about 10 microns in diameter and having a purity of at least 95%.

Methods heretofore known for producing pigment grade aluminum oxides are of two general types: (1) an aluminum halide is oxidized or hydrolyzed in a flame and (2) an aluminum salt having combined oxygen is thermally decomposed by external application of heat. Both of these types of reaction, in the light of the present invention, have certain disadvantages.

In carrying out a process of the first type the aluminum halide must be introduced into the reaction zone as a vapor, which vapor is necessarily at an elevated temperature. Conducting such hot vapors through conduits, valves and instruments, while not impossible, is difficult and complicates the process.

In carrying out a process of the second type heat to decompose the salt must be conducted through the walls of a reactor or gas heater. To provide sufficient heat in the reaction zone temperatures considerably greater than those required for the reaction must be applied to the external walls and the walls must be relatively thin and be able to withstand high temperatures and conduct heat. Hence materials of construction are of high cost and of short service life.

It is the principal object of this invention to provide a process and apparatus for producing pigment grade aluminum oxide from any aluminum salt available as a solid at atmospheric conditions by reacting the solid material in contact with a flame.

It is a further object of this invention to provide a process employing a universal reaction zone for any solid aluminum salt.

A further object of this invention is to provide a process and apparatus by and in which oxidation, hydrolysis or thermal decomposition of solid aluminum salts may be carried out in a turbulent flame supplied by a combustible gas and an oxygen-containing gas in such proportions that the nature, particle size and surface area of the resulting aluminum oxide product can be adjusted as desired.

In one aspect our invention comprises a process in which a solid aluminum salt, preferably powdered to facilitate handling, is introduced in a carrier gas into one end of an elongated heat insulated chamber and intermingled with a turbulent flame produced by burning a combustible gas with an oxygen-containing gas, generally air, introduced into the same end of the chamber. The various reactants are supplied to the reaction zone in such manner that a cyclonic flame of high turbulence is provided and maximum mixing of aluminum raw material and combustibles and combustion products is achieved. Various means for providing such turbulent mixing may be employed within the scope of our invention, the most convenient means being to introduce one or more of the reactants tangentially into the chamber.

The reaction of the aluminum salt in the flame is rapid and the resulting aluminum oxide pigment is finely divided, the average particle size being in the range 0.005 to 10 microns and the pigment having a surface area in the range 5 to 150 square meters per gram, particle size decreasing and surface area increasing with increasing turbulence and gaseous dilution in the reaction zone. A particularly troublesome problem encountered in reactions involving the production of metal oxides from their salts is in the separation of reaction by-products from the product oxide. In addition, when the salts are fusible, there is a tendency for the particles to agglomerate with the result that the product may be both coarse and impure. The present invention avoids these difficulties. By utilizing a cyclonic turbulent reaction zone, pigment size particles of aluminum oxide of high purity may readily be produced.

While any aluminum salt which is solid at atmospheric conditions can be used in the process of our invention the following salts are preferred: basic aluminum acetate, aluminum benzoate, aluminum bromate, aluminum bromide, aluminum chlorate, aluminum chloride, aluminum iodide, aluminum nitrate, aluminum oleate, aluminum oxalate, aluminum salicylate, aluminum stearate, aluminum sulfate, and aluminum sulfide.

Going into more detail, we refer to the accompanying drawings in connection with the following description of a preferred manner of carrying out the process of our invention, in which.

Figure 1:
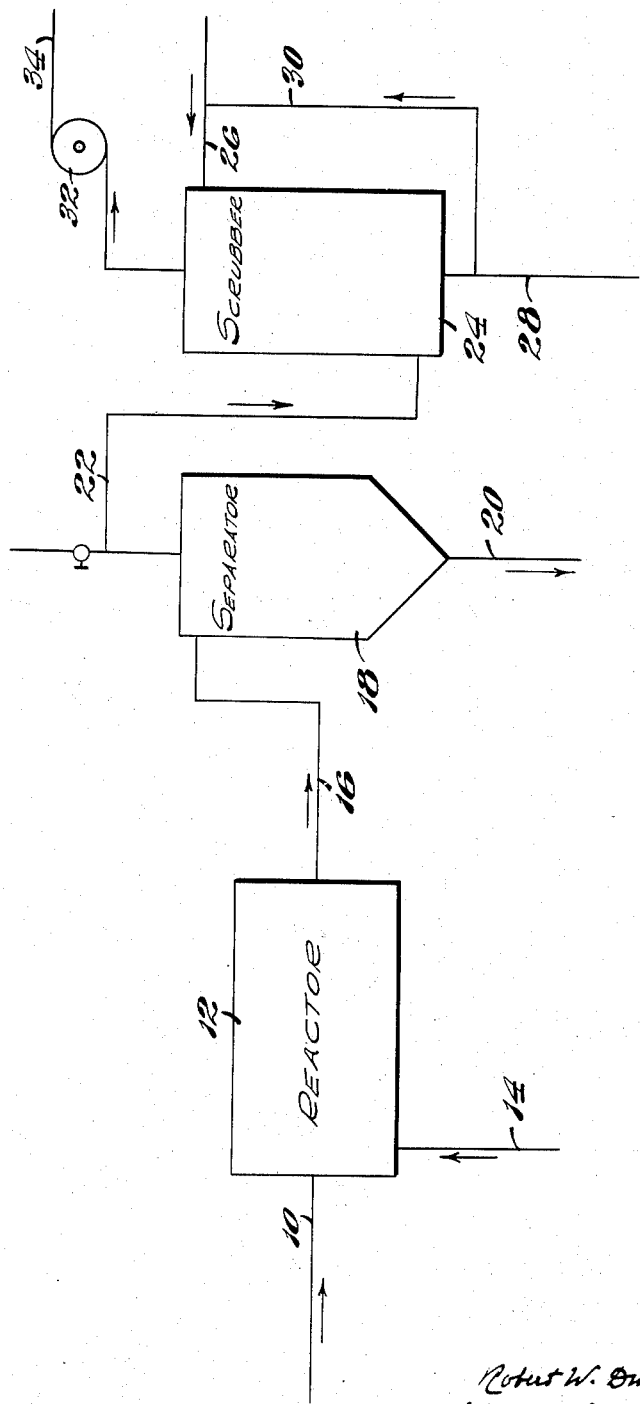
Fig. 1 is a flow sheet of the process.

In carrying out the process according to the flow diagram of Fig. 1, the aluminum salt, which may have a small amount of oxide admixed therewith to prevent caking, is introduced through feed pipe 10 into an elongated heat insulated reaction chamber 12. A mixture of gas and air in proportion such that there is sufficient air for theoretically complete combustion of the gas is introduced into the reactor through pipe 14. The inlet ends of pipes 10 and 14 are so positioned within the reactor with respect to one another that the aluminum salt will be intimately mixed with the combustion gases and hence with the resulting flame when the gases are ignited.

The bulk of the reaction by which the aluminum salt is converted to aluminum oxide and product gases is completed within reactor 12. The reaction products are then conducted through flue 16 to separator 18 which may be of the cyclone, filter, or any other convenient type. In the separator the solid oxide product is removed from the gases and recovered through outlet pipe 20.

The gases now largely freed of their solid content are exhausted from separator 18 through conduit 22 and are either discharged into the atmosphere or preferably are passed into a scrubber 24 of conventional design. As here illustrated spray liquid, consisting principally of water and whatever neutralizing chemical may be required for the particular aluminum salt in process, is introduced into the scrubber through pipe 26. Scrubbing liquid is discharged from the scrubber through pipe 28 and a portion may be recycled through pipe 30. Cleaned gases are discharged to the atmosphere through fan 32 and stack 34.

It is apparent that the process of our invention can readily be carried out in reactors of various design. It is merely necessary, as we have said, to provide a turbulent flame and to introduce the aluminum salt in finely divided form directly in the flame. Suitable types of reactor are shown in Figs. 2 and 3.

Figure 2:
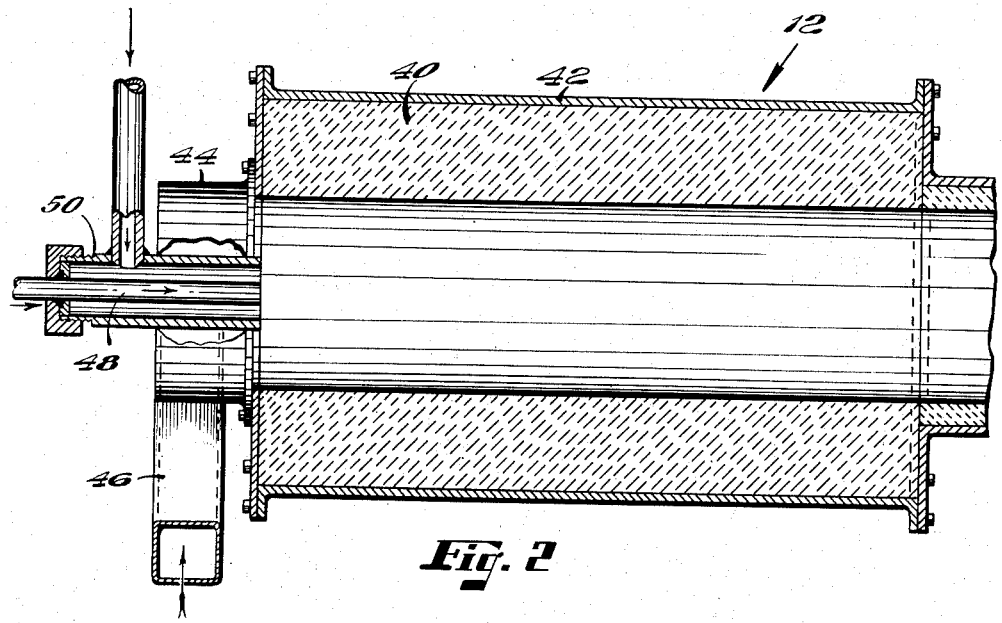
Fig. 2 is a view in vertical cross section of one suitable type of reactor.

Referring first to Fig. 2, the reactor 12 consists of a chamber having refractory walls 40 held in place by steel shell 42. The inlet end is enclosed by a circular air header 44 having a supply duct 46 preferably leading thereinto in a direction tangent to the inner wall. Centered in the inlet end of the reactor 12 is an aluminum salt feed pipe 48 surrounded by a larger gas pipe 50, the two pipes 48 and 50 being concentrically disposed. In the operation of this reactor powdered aluminum salt is suspended in a suitable gas and carried into the reactor through pipe 48. A mixture of combustible gas and air is introduced through pipe 50 and supplemental air is supplied through duct 46 and header 44. Combustible gas alone can be supplied through pipe 50 but it is preferable to premix with the gas a portion of the air required for combustion in order to insure complete burning of the gas. In entering tangentially through duct 46, the supplemental air produces an intensely turbulent cyclonic flame within the reaction zone.

Figure 3:
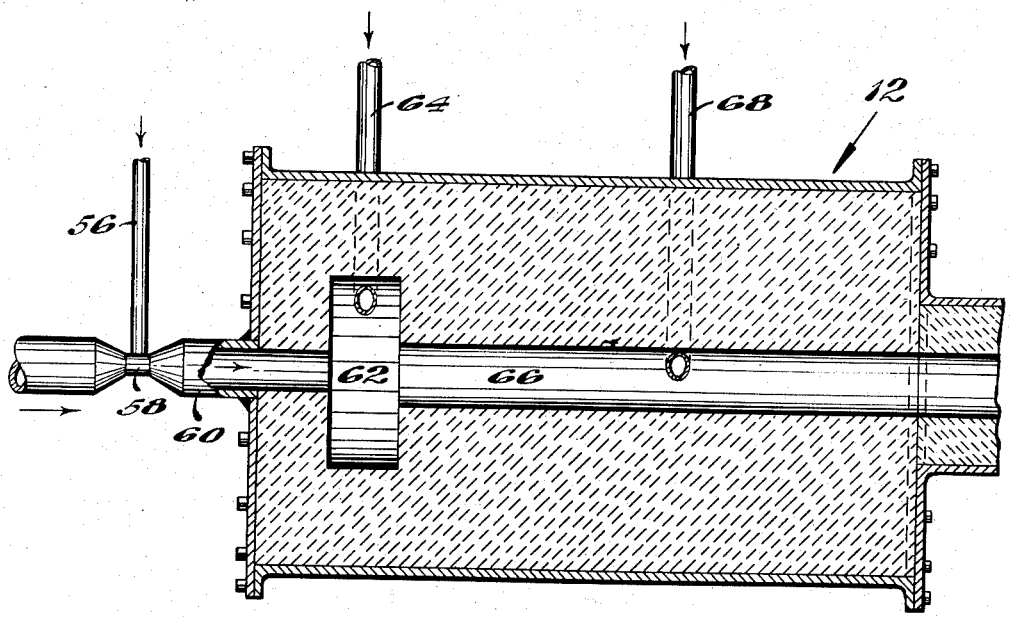
Fig. 3 is a view in vertical cross section of another suitable type of reactor additionally showing one satisfactory means for delivering the solid raw material to the reactor.

Another design of suitable reactor is shown in Fig. 3. In this type of reactor powdered aluminum salt is introduced thereinto through pipe 56, venturi section 58 and feed pipe 60. A suitable carrier gas passing through the venturi section of feed pipe 60 inspirates the powdered aluminum salt and carries it into a short, large diameter combustion chamber 62. A mixture of gas and air is introduced into a circular combustion chamber 62 through pipe 64 in a direction tangent to the inner wall of the chamber so that a rapidly whirling flame is developed therein. Chamber 62 communicates with a long tubular chamber 66 of smaller diameter in which reaction is completed. By reason of the reduction in diameter within the reaction chamber 12, great cyclonic turbulence is developed in combustion chamber 62 and very rapid mixing of combustion gases, combustion products and aluminum salt takes place.

If additional heat or diluent gases are required, they may be supplied downstream from the combustion chamber through conduit 68 also preferably directed tangent to the inner wall of the chamber.

It will be apparent that various modifications in operating methods may be employed. For example, with the reactor of Figure 2 aluminum salt can be introduced through pipe 50 and the combustible gas or mixture of gas and air can be supplied through pipe 48.

Likewise in the operation of reactor of Fig. 3 the aluminum salt can be introduced into the combustion chamber tangentially through conduit 64 while gas and air can be supplied through pipe 60. In all events, the feed conduits can be sized as required for optimum performance.

For satisfactory operation of the process of our invention, by which is meant the production of pigment grade aluminum oxide having an average particle size in the range below 10 microns, it is essential that the reactant flame be turbulent and that the reactant raw material be introduced directly into or in close juxtaposition to the flame. The optimum condition is dispersion of the aluminum salt through the burning combustion gases so that the particles of aluminum oxide as they form will be diluted by combustion product gases. Furthermore, this arrangement provides for very rapid reaction and quick removal of the oxide product from the reaction zone which is believed to be an important factor in achieving a fine particle size material.

An important advantage of this invention is that it makes readily available a wide variety of operating conditions by which particle size and surface area of the product can be varied and controlled. Thus, by changing the rate of input of reactants and varying the proportion of diluent gases to raw material a considerable variety of products can be obtained.

More specifically, it would appear that by increasing the ratio of air to combustible gas and hence increasing the ratio of diluents to raw material, the particle size of the product may be decreased, provided, of course that there is always present at least sufficient air for theoretically complete combustion of the combustible gas.

As has been stated above it is necessary to convey the aluminum salt into the reactor in a stream of gas. Obviously, the more finely powdered the aluminum salt, the more easily can this raw material be delivered in the gas. The carrier gas itself may be chosen with respect to the desired proportions of reactant gases. When a large excess of diluent air is required, the carrier gas will advantageously be air. On the other hand, if more combustible gas is required in close contact with the raw material a combustible gas can be used. An inert carrier gas is likewise within the contemplation of this invention.

In the following examples are set forth data from various runs carried out in accordance with our invention.

*Example 1*

The following runs were made in apparatus of the type shown in Figure 2, the aluminum salt raw material being aluminum chloride.

| Run No. | 192 | 195 | 198 | 205 | 195.2 |
|---|---|---|---|---|---|
| Aluminum chloride, lbs. per hr. | 9.0 | 8.75 | 12 | 9.1 | 6.8 |
| Combustible gas, C. F. m. | 3.5 | 5.5 | 4.8 | 5.0 | 3.8 |
| Air, C. F. M. | 20 | 30 | 25 | 14 | 20 |
| Yield $Al_2O_3$, percent of theoretical | 84.5 | 31 | 67 | 18 | 25 |
| $Al_2O_3$ production, lbs. per hour | 3 | 1.1 | 3.1 | .7 | .8 |
| Length of run in hours | .66 | 2.75 | 2.0 | 5.5 | 3.0 |
| Surface area ($N_2$) of product | 70.2 | 42 | 56 | 53 | 46 |
| Average particle size, millimicrons | 26.0 | 43.5 | 32.5 | 34.4 | 39.6 |

*Example 2*

The following runs were made in apparatus similar to that illustrated in Figure 3, the aluminum salt being finely ground hydrated aluminum sulfate $$(Al_2(SO_4)_3 \cdot 16.5H_2O)$$

95% of which being finer than 100 mesh.

| Run No. | 6 | 7 | 8 | 10 | 11 | 12 | 13 | 14 |
|---|---|---|---|---|---|---|---|---|
| Combustible gas | City | City | City | City | Hydrogen | Hydrogen | Hydrogen | Hydrogen. |
| Atmosphere | Reducing | Reducing | Oxidizing | Oxidizing | Reducing | Reducing | Reducing | Reducing. |
| Feed rate, lbs./hr. | 1.11 | 7.62 | 3.3 | 4.72 | 9.72 | 4.72 | 4.76 | 2.70. |
| Product recycle in feed, percent by wt. | 0 | 2 | 2 | 2 | 2 | 2 | 2 | 6. |
| Combustible gas, C. F. H. | 120 | 120 | 45 | 60 | 114 | 114 | 152 | 152. |
| Air, C. F. H. | 390 | 410 | 440 | 410 | 214 | 214 | 285 | 285. |
| Flame temp., °F. | 2,100 | 1,950 | 2,260 | 2,050 | 1,695 | 1,710 | 1,765 | 1,670. |
| $N_2$ surface area of prod. | 80 | 29.4 | 30 | 30 | 30 | 60.8 | 47.2 | 33.7. |

We claim:

1. The method of producing finely divided aluminum oxide comprising suspending solid particles of a hydrated aluminum salt in a carrier gas, introducing the suspension axially into a heat insulated elongated circularly cylindrical reaction chamber and simultaneously introducing into said reaction chamber a combustible gas and a free oxygen-containing gas, at least one of said gases being introduced tangentially against the wall of said chamber to create a cyclonic turbulent reaction zone, the oxygen-containing gas being in an amount at least sufficient to burn the combustible gas and to convert the aluminum salt to the oxide, burning said combustible gas to maintain a temperature within the reaction chamber sufficient to convert the aluminum salt to aluminum oxide, and recovering the aluminum oxide from the gaseous reaction products.

2. The method defined by claim 1 in which the aluminum salt is carried into the reaction zone by air as the carrier gas.

3. The method defined by claim 1 in which the aluminum salt is carried into the reaction zone by a combustible carrier gas.

4. The method defined by claim 1 in which the aluminum salt is introduced into the reaction zone suspended in a stream of combustible gas and air is introduced tangentially thereabout as a whirling annular stream surrounding the combustible gas.

5. The method defined by claim 1 in which the aluminum salt is selected from the group consisting of aluminum chloride and aluminum sulfate.

References Cited in the file of this patent

UNITED STATES PATENTS

| | | |
|---|---|---|
| 1,816,388 | Mittasch | July 28, 1931 |
| 1,850,286 | Mittasch | Mar. 22, 1932 |
| 2,155,119 | Ebner | Apr. 18, 1939 |
| 2,659,662 | Heller | Nov. 17, 1953 |

FOREIGN PATENTS

| | | |
|---|---|---|
| 258,313 | Great Britain | Sept. 15, 1926 |
| 661,685 | Great Britain | Nov. 28, 1951 |

OTHER REFERENCES

Serial No. 379,872, Ebner (A. P. C.), published April 27, 1943.